(12) United States Patent
Tsukamoto

(10) Patent No.: US 7,332,843 B2
(45) Date of Patent: Feb. 19, 2008

(54) MOTOR

(75) Inventor: Naoyuki Tsukamoto, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 200 days.

(21) Appl. No.: 11/251,447

(22) Filed: Oct. 14, 2005

(65) Prior Publication Data

US 2006/0082234 A1  Apr. 20, 2006

(30) Foreign Application Priority Data

| Oct. 14, 2004 | (JP) | ............................ 2004-300436 |
| Oct. 19, 2004 | (JP) | ............................ 2004-304772 |
| Oct. 19, 2004 | (JP) | ............................ 2004-304773 |
| Mar. 30, 2005 | (JP) | ............................ 2005-099950 |

(51) Int. Cl.
*H02K 7/08* (2006.01)
*H02K 23/00* (2006.01)
*H02K 5/16* (2006.01)

(52) U.S. Cl. ........................... 310/90; 310/89; 310/91

(58) Field of Classification Search ............ 310/89–91; 384/537, 539, 903, 906
See application file for complete search history.

(56) References Cited

U.S. PATENT DOCUMENTS

| 5,073,735 | A | * | 12/1991 | Takagi | ........................ | 310/71 |
| 5,089,735 | A | * | 2/1992 | Sawaguchi et al. | ........... | 310/88 |
| 5,838,081 | A | * | 11/1998 | Greentaner et al. | ........... | 310/90 |
| 5,899,574 | A | * | 5/1999 | Chujo | ........................ | 384/518 |
| 5,977,672 | A | * | 11/1999 | Vacca | ........................ | 310/90 |
| 5,977,673 | A | * | 11/1999 | Iwata | ........................ | 310/90 |
| 6,056,445 | A | * | 5/2000 | Ueno et al. | ................. | 384/492 |
| 6,196,812 | B1 | * | 3/2001 | Siegel | ........................ | 417/360 |
| 6,198,189 | B1 | * | 3/2001 | Takahashi et al. | ............ | 310/89 |
| 6,215,215 | B1 | * | 4/2001 | Huber et al. | .................. | 310/89 |
| 6,268,670 | B1 | * | 7/2001 | Kuragaki et al. | ......... | 310/75 R |

(Continued)

FOREIGN PATENT DOCUMENTS

JP  07194069 A * 7/1995

(Continued)

OTHER PUBLICATIONS

Journal of Nippondenso Technical Disclosure (Reference No. 106-033, published on Jan. 15, 1996), with its English Abstract.

*Primary Examiner*—Burton Mullins
(74) *Attorney, Agent, or Firm*—Marsh Fischmann & Breyfogle LLP

(57) ABSTRACT

A pump apparatus includes a motor unit and a pump unit. The motor unit includes a cylindrical yoke housing and a rotor accommodated in the yoke housing. A rotary shaft of the rotor is supported by a first bearing and a second bearing. In a direction from a bottom wall of the yoke housing toward an opening of the yoke housing, the first bearing, an armature, a commutator, and a second bearing are arranged in this order on the rotary shaft. A base plate is attached to the opening of the yoke housing. The base plate has a through hole for receiving the second bearing. The commutator has an outer diameter greater than the inner diameter of the through hole. A disc spring is located between the bottom wall and the first bearing. The disc spring urges the rotor in a direction from the bottom wall toward the opening.

21 Claims, 10 Drawing Sheets

U.S. PATENT DOCUMENTS

| | | | |
|---|---|---|---|
| 6,412,985 B1 * | 7/2002 | Schweitzer et al. | 384/585 |
| 6,420,811 B1 * | 7/2002 | Wetzel | 310/112 |
| 6,489,699 B2 * | 12/2002 | Hioki et al. | 310/90 |
| 6,729,765 B2 * | 5/2004 | Ni et al. | 384/295 |
| 6,779,990 B2 * | 8/2004 | Sekihara et al. | 417/415 |
| 2003/0025411 A1 * | 2/2003 | Gotou | 310/91 |
| 2003/0035716 A1 * | 2/2003 | Tanaka | 415/110 |
| 2004/0032174 A1 * | 2/2004 | Yeo et al. | 310/90 |

FOREIGN PATENT DOCUMENTS

| | | |
|---|---|---|
| JP | 10-248225 | 9/1998 |

* cited by examiner

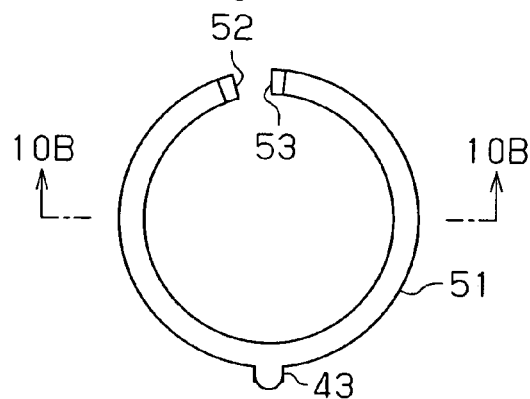
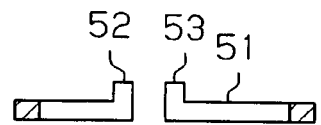
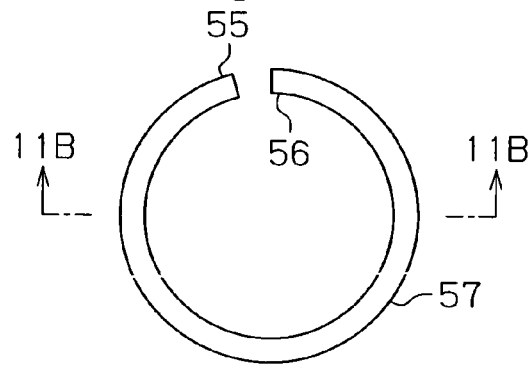
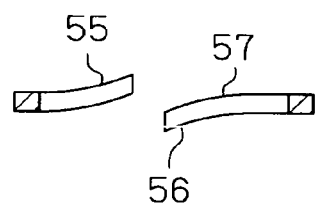
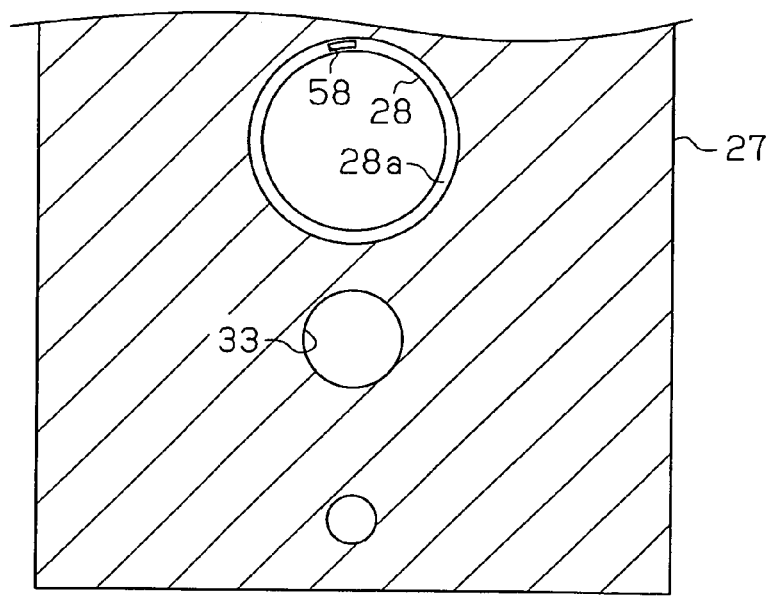

Fig.13A
Fig.13B
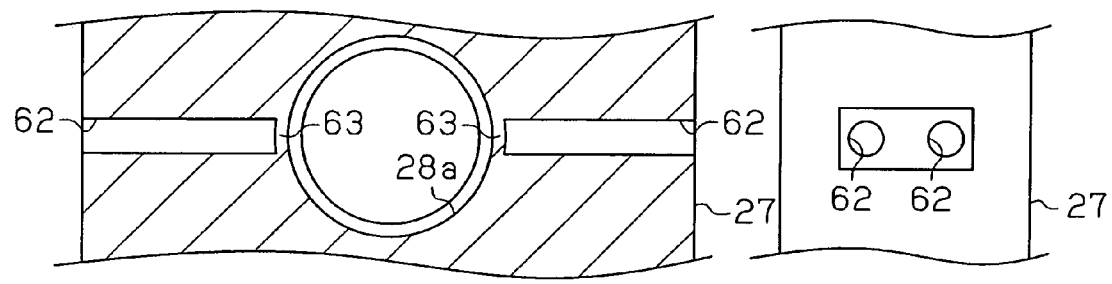
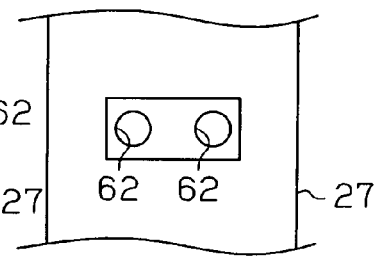
Fig.14A
Fig.14B
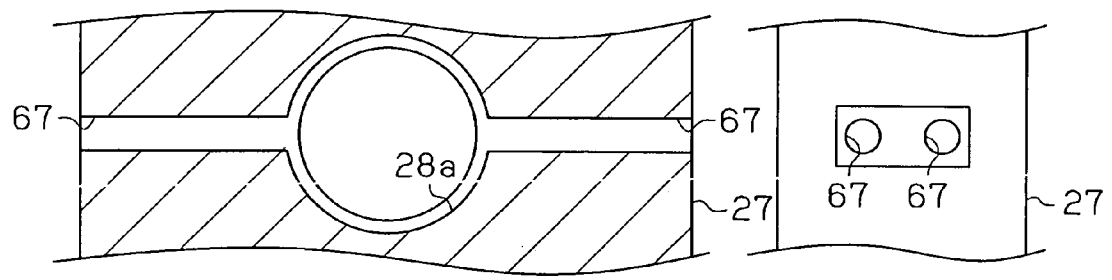
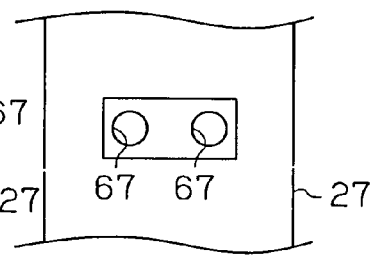
Fig.15
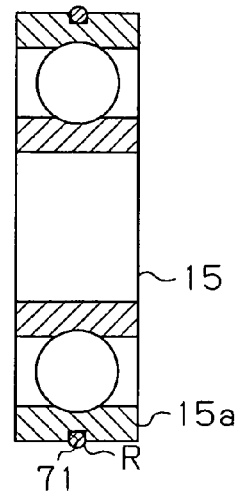

MOTOR

CROSS-REFERENCE TO RELATED APPLICATIONS

This application claims priority from Japanese Patent Application No. 2004-300436 filed Oct. 14, 2004, Japanese Patent Application No. 2004-304772 filed Oct. 19, 2004, Japanese Patent Application No. 2004-304773 filed Oct. 19, 2004, and Japanese Patent Application No. 2005-099950 filed Mar. 30, 2005. Each of these Japanese applications is incorporated by reference herein in its entirety as if set forth in full.

BACKGROUND OF THE INVENTION

The present invention relates to a motor in which a rotary shaft is supported by a yoke housing with bearings.

A typical motor includes a stator and a rotor accommodated in the stator. The stator includes a substantially cylindrical yoke housing with a bottom, and magnets. The magnets are arranged on the inner circumferential surface of the yoke housing along the circumferential direction. The rotor includes a rotary shaft, an armature and a commutator, which are fixed to the rotary shaft. The yoke housing has an opening at one end. The opening is covered with an end plate (base plate). The rotary shaft is supported by the yoke housing and the end plate with a pair of bearings.

In such a motor, it is preferable that the bearings be easily attached to the yoke housing and the end plate. For example, a document "JOURNAL OF NIPPONDENSO TECHNICAL DISCLOSURE" (Reference Number: 106-033, published on Jan. 15, 1996) discloses a resin end plate that has a structure for holding a bearing. This end plate has a holding portion on one side for receiving a bearing. A groove is formed on the circumferential surface of the bearing, and a projection is formed on an inner surface of the holding member that faces the outer circumferential surface of the bearing. When the bearing is fitted in the holding portion, the projection engaged with the groove so that the bearing is attached to the end plate while being prevented from moving in the axial direction. The end plate also includes a brush holder integrated with the end plate on a side opposite from the side on which the holding portion is formed.

To attach the bearing to the end plate while preventing the bearing from chattering, the holding portion needs to have high dimensional accuracy. However, since the end plate is made of resin, sufficient dimensional accuracy cannot be guaranteed by simply molding the end plate. That is, after molding, the end plate needs to be subjected to additional machining such as cutting. Further, to attach the bearing to the holding portion, a process for press fitting the bearing into the holding portion is required. This increases the manufacturing costs.

Recently, in accordance with the increased number of functions of vehicles, there is a demand for small motors. However, the end plate disclosed in the above document has the holding portion and the brush holder on opposite sides. That is, the bearing attached to the holding portion is located at one side of the end plate, while a commutator that contacts brushes attached to the brush holder is located at the other side of the end plate. In other words, the end plate is located between the bearing and the commutator with respect to the axial direction of the motor. This increases the size of the motor in the axial direction.

SUMMARY OF THE INVENTION

Accordingly, it is an objective of the present invention to provide a simply structured motor that is easy to manufacture and reduces the size in the axial direction.

To achieve the foregoing and other objectives and in accordance with the purpose of the present invention, a motor including a cylindrical yoke housing, a rotor, a bearing, a base plate, and an urging member is provided. The cylindrical yoke housing has a bottom wall at one end and an opening at the other end. The rotor is accommodated in the yoke housing. The rotor includes a rotary shaft, an armature, and a commutator. The armature has a core and a coil wound about the core. The armature and the commutator are fixed to the rotary shaft. The bearing supports the rotary shaft. The armature, the commutator, and the bearing are arranged on the rotary shaft in this order in the direction from the bottom wall toward the opening. The base plate is attached to the opening of the yoke housing. The base plate has a through hole into which the bearing is inserted. The commutator has an outer diameter greater than an inner diameter of the through hole. The urging member urges the rotor in the direction from the bottom wall toward the opening.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10A is a front view illustrating a washer according to a modification;

FIG. 10B is a cross-sectional view taken along line 10B-10B of FIG. 10A;

FIG. 11A is a front view illustrating a washer according to another modification;

FIG. 11B is a cross-sectional view taken along line 11B-11B of FIG. 11A;

FIG. 12 is a partial cross-sectional view of a pump housing in which the washer shown in FIG. 11A is used;

FIG. 13A is a partial cross-sectional view illustrating a pump housing according to a further modification;

FIG. 13B is a partial side view illustrating the pump housing shown in FIG. 13A;

FIG. 14A is a partial cross-sectional view illustrating a pump housing according to another modification;

FIG. 14B is a partial side view illustrating the pump housing shown in FIG. 14A;

FIG. 15 is a cross-sectional view illustrating a second bearing used in a rotation prevention mechanism according to a modification;

DETAILED DESCRIPTION OF THE PREFERRED EMBODIMENTS

A first embodiment of the present invention will now be described with reference to the drawings.

Figure 1:
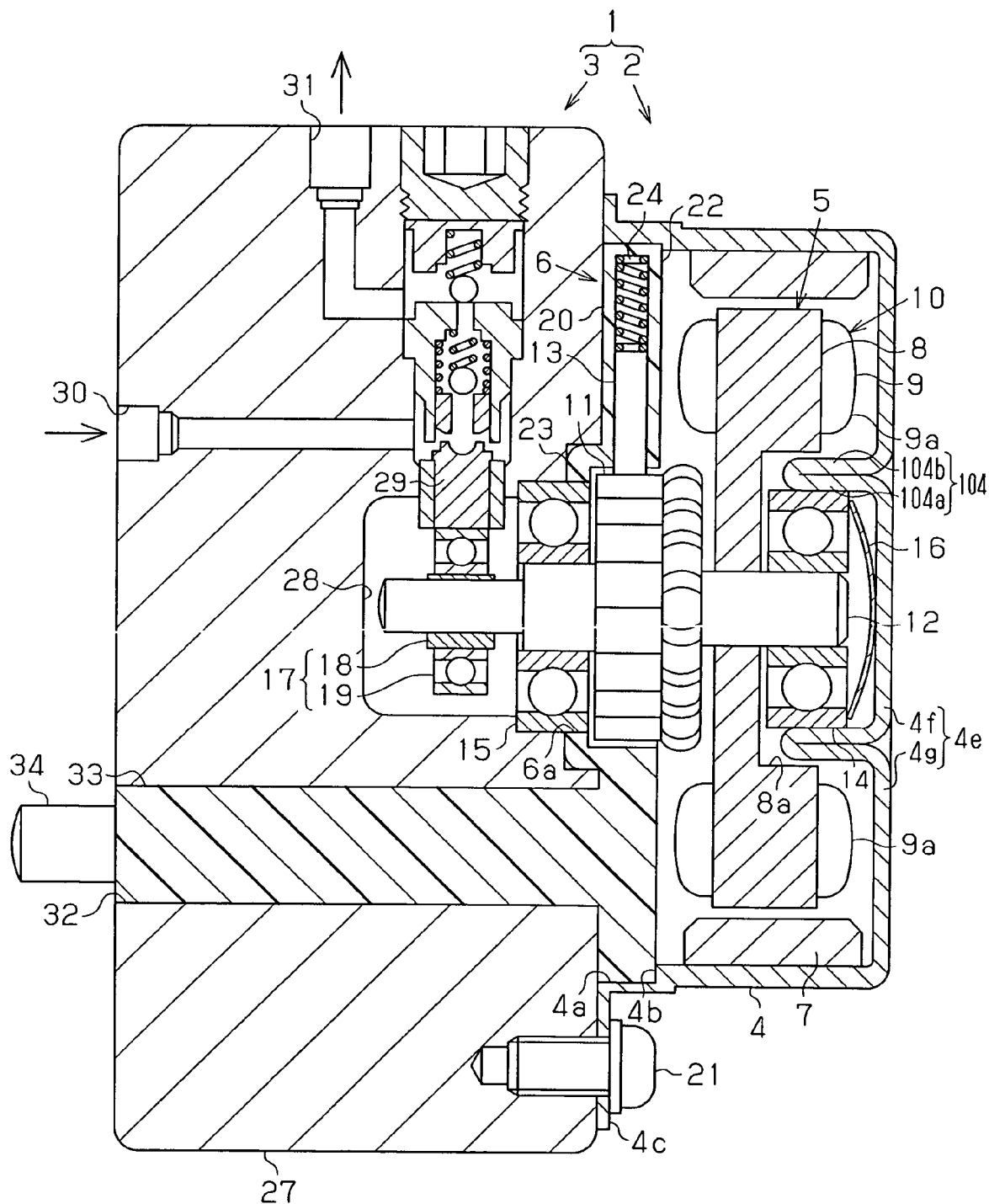
FIG. 1 is a diagrammatic cross-sectional view illustrating a pump apparatus according to a first embodiment of the present invention.

FIG. 1 illustrates an example in which a motor according to the present invention is applied to a pump apparatus. A pump apparatus 1 has a motor unit and a pump unit 3 that is driven by the motor unit 2 to pressurize and transfer fluid.

The motor unit 2 includes a cylindrical yoke housing 4 having a bottom wall 4e at one end, a rotor 5 accommodated in the yoke housing 4, and a brush holder device 6 provided in an opening 4a of the yoke housing 4.

Magnets 7 are fixed to the inner circumferential surface of the yoke housing 4. The magnets 7 are arranged along the circumferential direction of the yoke housing 4 to surround the rotor 5. The rotor 5 includes a rotary shaft 12 and an armature 10, and a commutator 11. The armature 10 is formed by winding coils 9 on a core 8. The armature 10 and the commutator 11 are fixed to the rotary shaft 12 to rotate integrally with the rotary shaft 12. The outer circumferential surface of the commutator 11 contacts a pair of brushes 13 (only one is shown) provided in the brush holder device 6. The armature 10 rotates in response to supply of electricity from the brushes 13.

The rotary shaft 12 is supported by a first bearing 14 and a second bearing 15. The bearings 14, 15 are ball bearings. The first bearing 14 supports one end (proximal end) of the rotary shaft 12, while the second bearing 15 supports a section of the rotary shaft 12 that is closer to the axial center than the other end. The first bearing 14 is accommodated in and held by a support portion 104 formed in a center of the bottom wall 4e of the yoke housing 4. The second bearing 15 is held by holding portion 23 provided substantially in a center of the brush holder device 6.

The support portion 104 accommodates a disc spring 16 located between the first bearing 14 and the bottom wall 4e of the yoke housing 4. The disc spring 16 urges the first bearing 14, the rotor 5 including the rotary shaft 12 attached to the first bearing 14, and the second bearing 15 attached to the rotary shaft 12 toward the pump unit 3.

Figure 5:
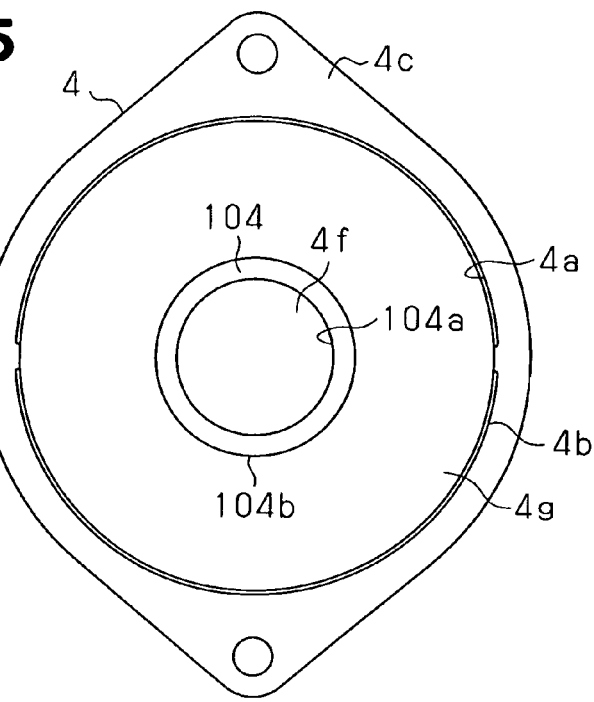
FIG. 5 is a front view of the yoke housing.

The support portion 104 is annular (see FIG. 5) and projects from the bottom wall 4e of the yoke housing 4 toward the interior of the yoke housing 4. The support portion 104 is formed by bending the bottom wall 4e of the yoke housing 4, and includes a first wall 104a forming an inner circumferential wall of the support portion 104 and a second wall 104b forming an outer circumferential wall of the support portion 104. That is, the support portion 104 has a double-layer structure with respect to the radial direction from the distal end to the proximal end in the axial direction. The first bearing 14 contacts and is held by the inner circumferential surface of the first wall 104a.

The bottom wall 4e includes an inner wall portion 4f and an outer wall portion 4g. The inner wall portion 4f is located radially inward of the first wall 104a (that is, the inner wall portion 4f form the bottom wall of the support portion 104). The outer wall portion 4g is located radially outward of the second wall 104b. The inner wall portion 4f is formed so as not to protrude further outward than the outer wall portion 4g in the axial direction (rightward as viewed in FIG. 1). In this embodiment, the inner wall portion 4f is substantially flush with the outer wall portion 4g. In other words, the outer surface of the inner wall portion 4f is substantially flush with the outer surface of the outer wall portion 4g. The yoke housing 4 is formed as an integral component by pressing a metal material.

The rotary shaft 12 extends to the pump unit 3 through the brush holder device 6. An eccentric bearing 17 is fixed to a portion of the rotary shaft 12 that is located in the pump unit 3. The eccentric bearing 17 includes a ball bearing 18 and an eccentric bushing 19 press fitted into the inner ring of the ball bearing 18. The rotary shaft 12 is press fitted in and fixed to the eccentric bushing 19. Thus, when the rotary shaft 12 rotates, the eccentric bearing 17 moves in an eccentric orbit. The eccentric bushing 19 may be formed integrally with the rotary shaft 12. That is, the rotary shaft 12 may have an eccentric portion the axis of which is decentered relative to the axis of the rotary shaft 12, and the ball bearing 18 may be fitted in the eccentric portion.

The brush holder device 6 includes a resin base plate (end plate) 20. The base plate 20 is press fitted to and fixed to the opening 4a of the yoke housing 4 so as to close the opening 4a. A step 4b is formed on a circumferential surface of the yoke housing 4 in the vicinity of the opening 4a. A section of the inner circumferential surface on the side of the opening 4a with respect to the step 4b form a fitting portion that has a diameter greater than the diameter of the remainder of the inner circumferential surface. The base plate 20 is fitted to the fitting portion. The step 4b is engaged with the base plate 20 and prevents the base plate 20 from moving further inward into the yoke housing 4.

The yoke housing 4 has a flange 4c that extends radially outward from the open end. The flange 4c is fixed to a pump housing (housing member) 27 of the pump unit 3 with bolts 21. In a state where the base plate 20 contacts the step 4b, the outer end surface of the base plate 20 is located in the same plane as the outer surface of the flange 4c. When the yoke housing 4 is fixed to the pump housing 27, the brush holder device 6 is held by the yoke housing 4 and the pump housing 27 so that the position of the brush holder device 6 is determined relative to the housings 4, 27.

A pair of holder main bodies 22 (only one is shown) for holding the brushes 13 are each provide on a side of the base plates 20 that is exposed to the interior of the yoke housing 4. The holding portion 23 is provided substantially in a center of the side of the base plate 20 that faces the pump housing 27. The base plate 20 is molded as an integral resin component that has the integrated holder main bodies 22 and holding portion 23. The brushes 13 are movable in radial directions of the motor unit 2 in the holder main bodies 22. Each brush 13 is urged radially inward by a spring 24 accommodated in the corresponding holder main body 22 so that the distal end of the brush 13 contacts the commutator 11.

Figure 2:
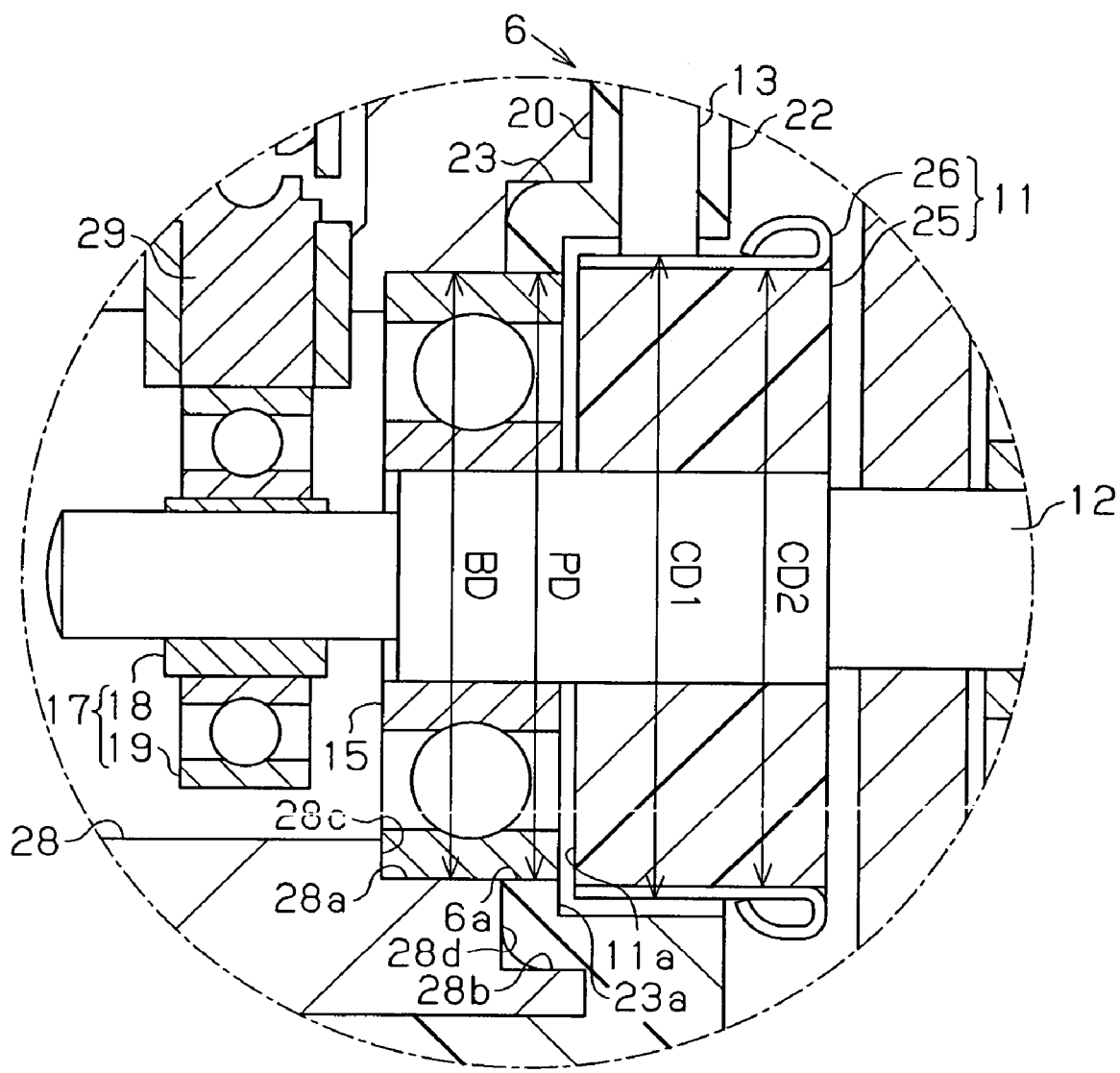
FIG. 2 is an enlarged partial cross-sectional view of FIG. 1.

The holding portion 23 projects from the base plate 20 toward the pump housing 27. The holding portion 23 has in a center a through hole 6*a* for holding the second bearing 15. In FIG. 2, the inner diameter of the through hole 6*a* is denoted by symbol PD, while the outer diameter of the second bearing 15 is denoted by symbol BD. The inner diameter PD of the through hole 6*a* is slightly greater than the outer diameter BD of the second bearing 15. The thickness of the holding portion 23 is less than the thickness of the second bearing 15 in the axial direction, and the second bearing 15 projects from the holding portion 23 toward the pump unit 3.

As shown in FIG. 2, the commutator 11 includes a substantially cylindrical insulator 25 and metal segments 26. The insulator 25 is formed, for example, of resin. The segments 26 are arranged on the outer circumferential surface of the insulator 25 at equal intervals. The segments 26 are electrically connected to the coils 9. When the rotor 5 rotates, the distal ends of the brushes 13 slide on the segments 26. The outer diameter CD1 of the commutator 11 is greater than the inner diameter PD of the through hole 6*a*. The outer diameter CD2 of the insulator 25 is greater than the outer diameter BD of the second bearing 15.

Figure 3:
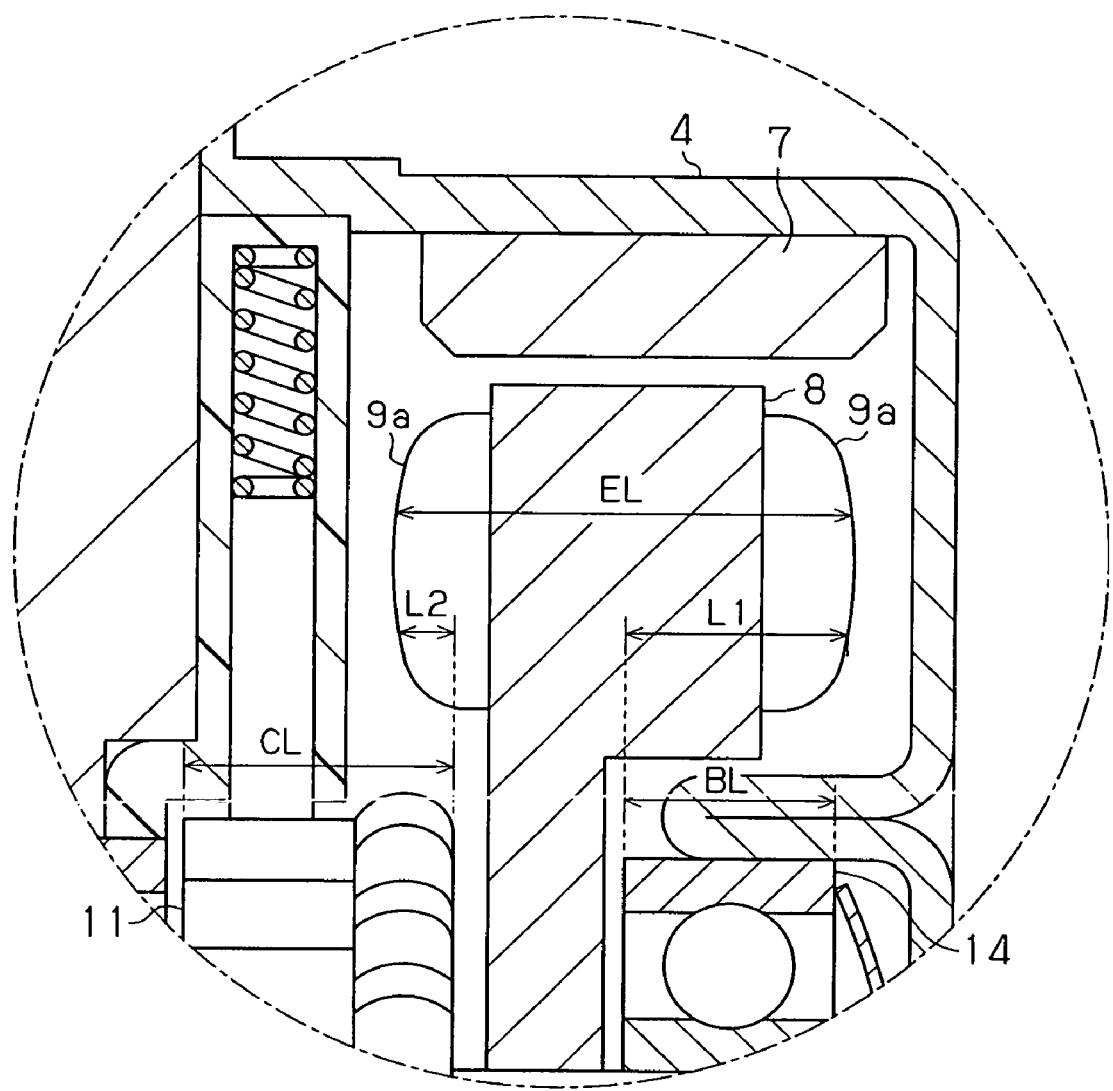
FIG. 3 is an enlarged partial cross-sectional view of FIG. 1.

The core 8 of the armature 10 shown in FIGS. 1 and 3 has teeth that extend in radial directions and are arranged at equal intervals along the circumferential direction. The coils 9 are each wound about one of the teeth. The core 8 has a recess-like accommodation portion 8*a* in a portion that faces the support portion 104. The inner diameter of the accommodation portion 8*a* is greater than the outer diameter of the support portion 104. The support portion 104 and the first bearing 14 held by the support portion 104 partly located in the accommodation portion 8*a*. Therefore, the first bearing 14 and the armature 10 overlap each other in the axial direction.

In FIG. 3, the dimensions of the coil 9, the commutator 11, and the first bearing 14 in the axial direction of the motor unit 2 (axial dimensions) are denoted by symbols EL, CL, BL, respectively. The axial dimension EL of the coil 9 is greater than the axial dimension of the core 8. Ends of each coil 9 with respect to the axial direction of the armature 10 are referred to as coil ends 9*a*. The first bearing 14 is located within a range of the axial dimension EL of the coils 9 with respect to the axial direction of the motor unit 2, that is, within the range of the axial dimension EL between the coil ends 9*a*. The commutator 11 is partly located within the range of the axial dimension EL of the coils 9 with respect to the axial direction of the motor unit 2. The first bearing 14 overlaps the coils 9 by length L1 along the axial direction, the commutator 11 overlaps the coils 9 by length L2 along the axial direction. In this embodiment, the first bearing 14, the armature 10, and the commutator 11 are arranged in line on the rotary shaft 12. However, the axial dimension from the first bearing 14 to the commutator 11 is less than the sum of the axial dimensions (BL+EL+CL) of the first bearing 14, the armature 10, and the commutator 11 by an amount corresponding to the sum of the lengths of the overlapped portions (L1+L2).

As shown in FIG. 1, the pump housing 27 of the pump unit 3 includes an accommodation portion 28 that opens to the motor unit 2. In a state where the motor unit 2 is fixed to the pump housing 27, the holding portion 23 of the brush holder device 6 and a portion that projects from the holding portion 23 (a part of the second bearing 15, a part of the rotary shaft 12, and the eccentric bearing 17) are accommodated in the accommodation portion 28. A plunger 29 located in the pump housing 27 contacts the outer circumferential surface of the eccentric bearing 17. The pump housing 27 has an oil suction port 30 and an oil discharge port 31. When the rotor 5 rotates, motion of the eccentric bearing 17 causes the plunger 29 to reciprocate. This draws oil through the suction port 30 and discharges the oil through the discharge port 31.

As shown in FIG. 2, the accommodation portion 28 of the pump housing 27 has a first receiving portion 28*b* that receives the holding portion 23 at the opening, and a second receiving portion (bearing receiving portion) 28*a* that is adjacent to the first receiving portion 28*b* and receives the second bearing 15. The diameter of the first receiving portion 28*b* is greater than the diameter of the second receiving portion 28*a*. The diameter of the second receiving portion 28*a* is greater than the diameter of a part of the accommodation portion 28 that is inward of the second receiving portion 28*a*. A step that forms a bearing receiving surface (stopping surface) 28*c* between the second receiving portion 28*a* and a part of the accommodation portion 28 that is inward of the second receiving portion 28*a*. In a state where the motor unit 2 is fixed to the pump housing 27, the holding portion 23 is accommodated in the first receiving portion 28*b*, and the second bearing 15 is accommodated in the second receiving portion 28*a*. The second bearing 15 contacts the bearing receiving surface 28*c*, which coincides with a plane perpendicular to the axis of the accommodation portion 28.

As shown in FIG. 1, the pump housing 27 has a through hole 32 that extends along the axial direction of the rotary shaft 12. The through hole 32 receives a holding portion 33 that extends from the base plate 20. A wiring plate 34, which is electrically connected to the brushes 13, is embedded in the holding portion 33. The holding portion 33 extends through the through hole 32 to expose an end of the wiring plate 34 from the pump housing 27.

A method for assembling the above described pump apparatus 1 will now be described with reference to the drawings.

Figure 4A:
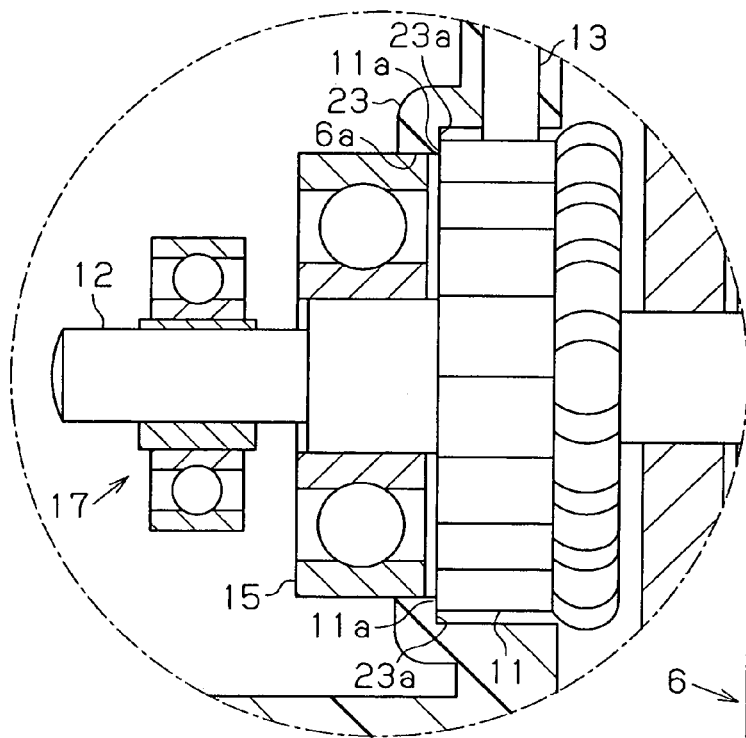
FIG. 4A is an enlarged view illustrating a section indicated by a circle 4A in FIG. 4.
Figure 4:
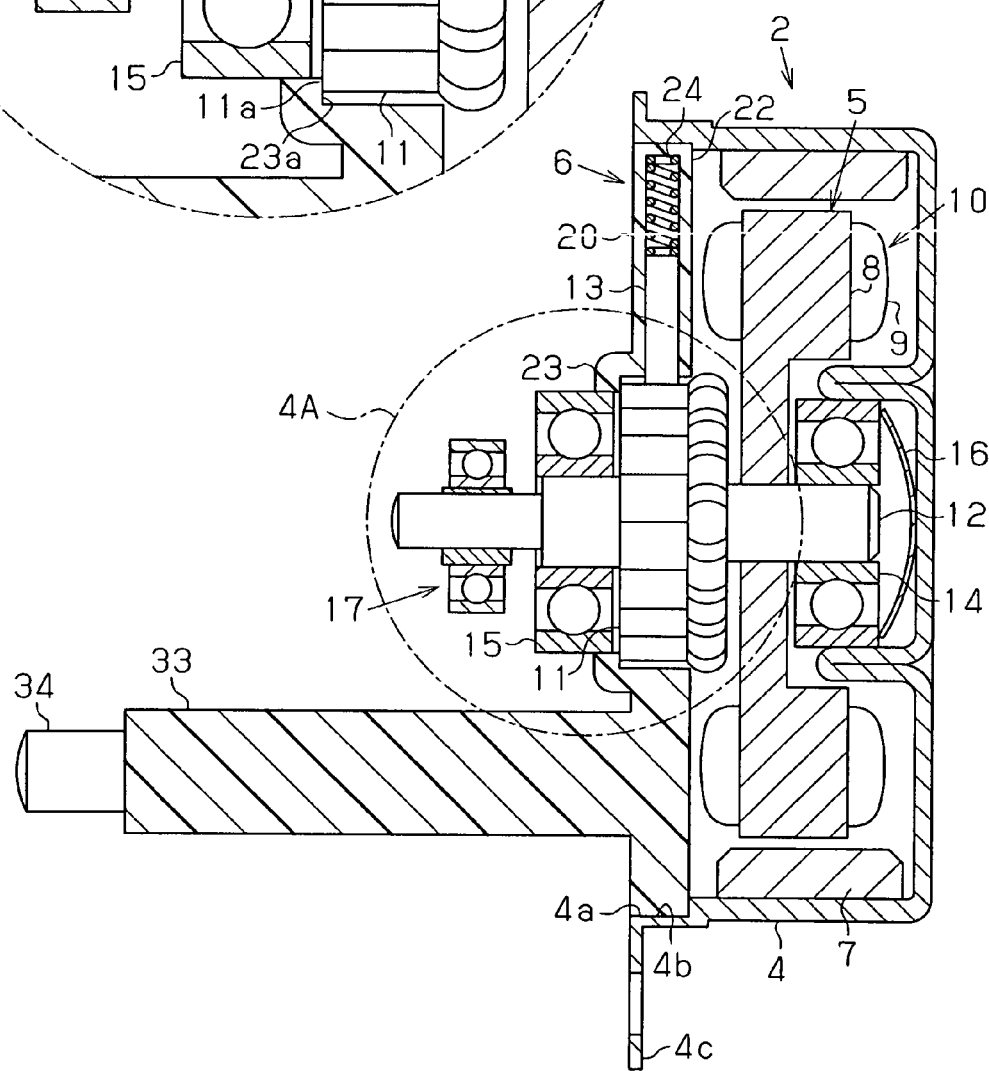
FIG. 4 is a diagrammatic cross-sectional view illustrating a motor unit of the pump apparatus shown in FIG. 1.

Referring to FIGS. 4 and 4A, a method for assembling the motor unit 2 will be described first. Initially, the rotor 5 is prepared which is formed by assembling the first bearing 14, the armature 10, the commutator 11, the second bearing 15, and the eccentric bearing 17 to the rotary shaft 12. The components 14, 10, 11, 15, 17 assembled to the rotary shaft 12 cannot be moved in the axial direction relative to the rotary shaft 12. Then, the rotor 5 is inserted into the through hole 6*a* of the brush holder device 6 from the end at the side of the eccentric bearing 17, thereby causing an end face 11*a* of the commutator 11 to contact an inner bottom surface (stopping surface) 23*a* of the holding portion 23 (see FIG. 4A). At this time, the second bearing 15 is in the through hole 6*a*. In this state, the base plate 20 is press fitted into the opening 4*a* of the yoke housing 4 so as to cover the first bearing 14, the armature 10, and the commutator 11 with the yoke housing 4. At this time, the first bearing 14 is inserted into the support portion 104 of the yoke housing 4, and the entire rotor 5, which includes the first bearing 14, is urged by the disc spring 16 in a direction away from the bottom wall 4*e* of the yoke housing 4.

Since the inner diameter of the through hole 6*a* of the brush holder device 6 is slightly greater than the outer diameter of the second bearing 15, the inner circumferential surface of the through hole 6a holds the second bearing 15 such that the second bearing 15 is movable in the axial direction. Since the outer diameter CD1 of the commutator 11 and the outer diameter CD2 of the insulator 25 are greater than the inner diameter PD of the through hole 6a (see FIG. 2), the end face 11a of the commutator 11 is pressed against the stopping surface 23a about the through hole 6a when the rotor 5 is urged by the disc spring 16. This limits the axial movement of the rotor 5. That is, although the second bearing 15 is movable in the axial direction relative to the through hole 6a in a state where the motor unit 2 is not fixed to the pump housing 27, the rotor 5 is held in a stable manner in the yoke housing 4 when the rotor 5 is urged by the disc spring 16 so that the commutator 11 is pressed against the base plate 20.

Then, as shown in FIG. 1, the pump unit 3, which is a driven device, is assembled with the motor unit 2. That is, the motor unit 2 is assembled with the pump housing 27 such that the eccentric bearing 17 projecting from the through hole 6a is inserted into the accommodation portion 28, and that the holding portion 33 extending from the base plate 20 is inserted into the through hole 32. At this time, an end face of the second bearing 15 contacts the bearing receiving surface 28c of the second receiving portion 28a formed in the accommodation portion 28 (see FIG. 2). Then, the entire rotor 5, which includes the second bearing 15, is pushed back toward the bottom wall 4e of the yoke housing 4 against the urging force of the disc spring 16. Therefore, the end face 11a of the commutator 11 separates from the stopping surface 23a of the holding portion 23. Also, the second bearing 15 is fitted in the second receiving portion 28a and contacts the bearing receiving surface 28c, so that the axial position and the radial position of the second bearing 15 are fixed to normal positions.

When electricity is supplied to the brush 13 through the wiring plate 34 in the pump apparatus 1 that is assembled in the above described manner, the rotor 5 rotates and the eccentric bearing 17 moves in an eccentric orbit. This causes the plunger 29 to reciprocate so that oil is drawn in through the suction port 30 and discharged through the discharge port 31.

This embodiment has the following advantages.

The outer diameter CD1 of the commutator 11 is greater than the inner diameter PD of the through hole 6a, and, in the yoke housing 4, the rotor 5 is urged in a direction projection from the through hole 6a. The end face 11a of the commutator 11 is therefor pressed against the stopping surface 23a of the holding portion 23, so that the axial movement of the rotor 5 is limited. As a result, the rotor 5 is held in the motor unit 2 in a stable manner even if the through hole 6a of the base plate 20 is not formed with a high accuracy. Also, since the second bearing 15 does not need to be pressed fitted into the through hole 6a, the motor unit 2 is easily assembled.

When the motor unit 2 is assembled with the pump unit 3, an end face of the second bearing 15 contacts the bearing receiving surface 28c of the pump housing 27, and the rotor 5 is pushed back toward the bottom wall 4e of the yoke housing 4 against the urging force of the disc spring 16. Accordingly, the end face 11a of the commutator 11 separates from the stopping surface 23a of the holding portion 23, so that the rotor 5 can rotate. This simplifies the structure of the motor unit 2 and facilitates the assembly of the pump apparatus 1.

The commutator 11 is located at the side of the base plate 20 that is exposed to the interior of the yoke housing 4. On the other hand, the second bearing 15 is inserted into the through hole 6a of the base plate 20 and partly overlaps the base plate 20 with respect to the axial direction. Therefore, unlike the case where the commutator 11 and the second bearing 15 are provided on both sides the base plate 20, respectively, the motor unit 2 is reduced in size in the axial direction. Further, since the second bearing 15 is held by the inner circumferential surface of the through hole 6a with respect to the radial direction, no component is required between the second bearing 15 and the commutator 11 to hold the second bearing 15 with respect to the radial direction. This also contributes to reduction in the size of the motor unit 2 in the axial direction.

Since a part of the second bearing 15 is exposed to the outside from the base plate 20, the yoke housing 4 does not need to be formed to have an axial size large enough to accommodate the entire the second bearing 15. Therefore, the size of the yoke housing 4 is reduced in the axial direction. Since the part of the second bearing 15 that is exposed from the base plate 20 is accommodated in the pump housing 27, the size of the entire pump apparatus 1 is reduced in the axial direction. Hydraulic loads in radial directions applied to the rotary shaft 12 by the plunger 29 are received by the pump housing 27 via the second bearing 15. The base plate 20 therefore does not need to have a high strength. That is, the base plate 20 may be formed as a thin plate or made of resin.

Since the base plate 20 is made of resin, the base plate 20 is lighter compared to the case where the base plate 20 is made of metal. Further, according to the present embodiment, the rotor 5 is stably held in the yoke housing 4 without forming the through hole 6a with a high accuracy. This permits the base plate 20 to be easily manufactured with resin.

Since the base plate 20 is press fitted and fixed to the opening 4a of the yoke housing 4, the base plate 20 does not need to be fixed with fasteners such as screws. This reduces the number of components and simplifies the assembly of the motor unit 2.

Since the first bearing 14 and the commutator 11 are arranged to overlap each other along the axial direction of the coils 9, the axial size of the motor unit 2 is reduced. Also, a common structure is employed in which the first bearing 14, the armature 10, and the commutator 11 are arranged in line on the rotary shaft 12. That is, no special configuration is employed. Thus, conventional and common components can be used. This improves the versatility.

The outer diameter BD of the second bearing 15 is determined not to exceed the outer diameter CD2 of the insulator 25. This prevents the metal segments 26 from contacting the second bearing 15. The distance between the commutator 11 and the second bearing 15 can therefore be minimized with respect to the axial direction. This contributes to reduction in the axial size of the motor unit 2.

On the bottom wall 4e of the yoke housing 4, the inner wall portion 4f, which is a portion corresponding to the support portion 104, is provided so as not to protrude further outward in the axial direction compared to the outer wall portion 4g about the inner wall portion 4f. This permits the pump apparatus 1 to be stably installed while preventing the pump apparatus 1 from interfering with other apparatuses.

Since the support portion 104 of the yoke housing 4 is formed by a pair of annular walls 104a, 104b, which adjacent to each other in the radial direction, the support portion 104 has a high strength against loads in radial directions. The support portion 104, which projects from the bottom wall 4e of the yoke housing 4 toward the opening 4a of the yoke housing 4, and is folded back at the projecting end, can be easily formed by reverse drawing.

A second embodiment according to the present invention will now be described. The differences from the first embodiment will be mainly discussed.

Figure 6:
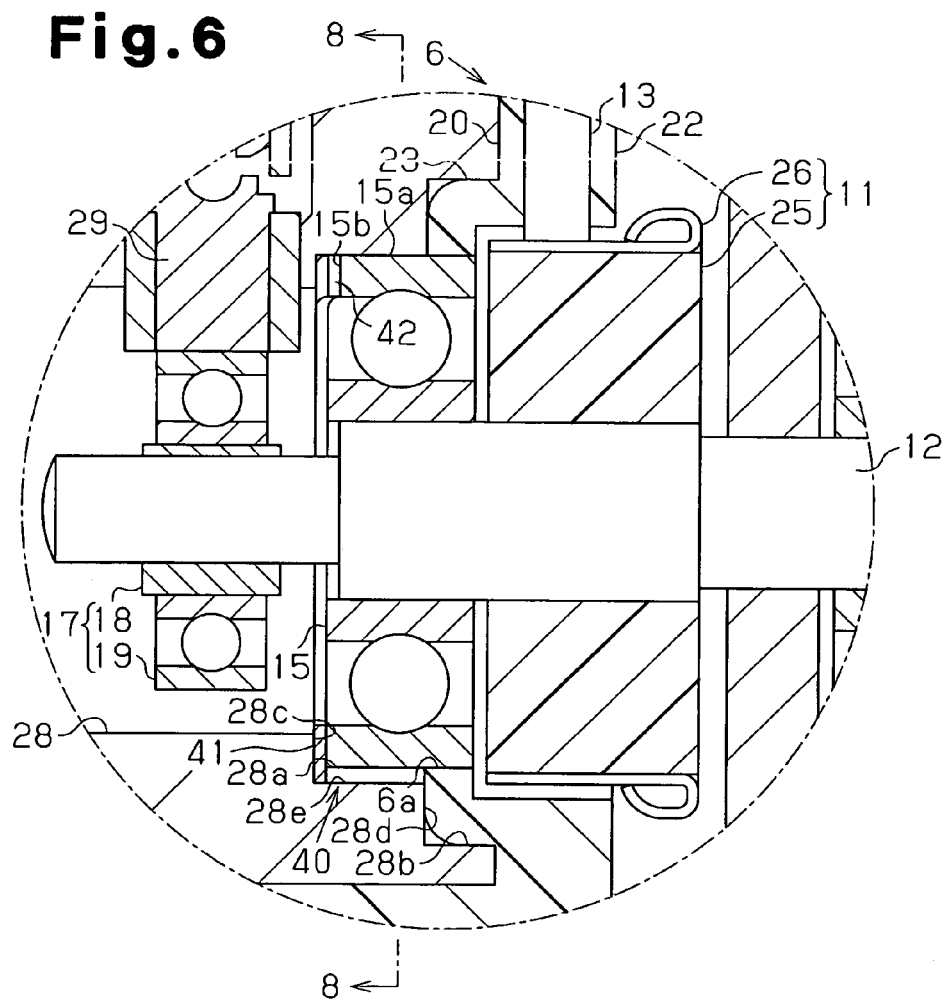
FIG. 6 is an enlarged partial cross-sectional view illustrating a pump apparatus according to a second embodiment of the present invention.

As shown in FIG. 6, the second embodiment is configured by adding a prevention mechanism 40 to the pump apparatus according to the first embodiment. The prevention mechanism 40 prevents rotation of the second bearing 15 about its axis. The prevention mechanism 40 prevents rotation of the outer ring 15a of the second bearing 15 about the axis in the second receiving portion 28a. The prevention mechanism 40 includes an engagement groove 15b formed in the outer ring 15a of the second bearing 15, an engagement groove 28e formed in the second receiving portion 28a of the pump housing 27, and a washer 41 functioning as an engaging member.

Figure 7A:
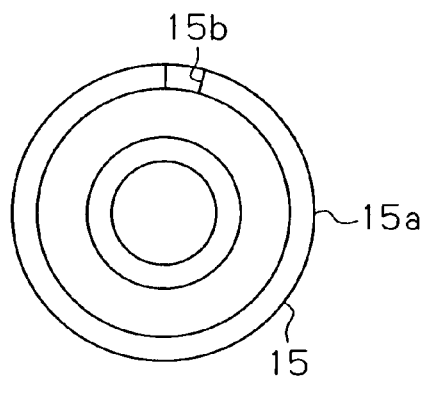
FIG. 7A is a front view illustrating a second bearing according to the second embodiment.
Figure 7B:
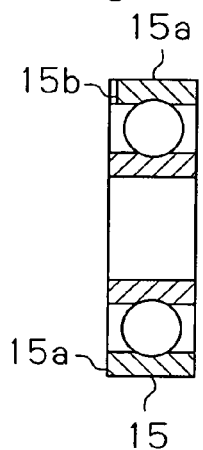
FIG. 7B is a cross-sectional view illustrating the second bearing shown in FIG. 7A.

As shown in FIGS. 7A and 7B, the engagement groove 15b is formed on one end face of the outer ring 15a of the second bearing 15 and extends in a radial direction. As shown in circumferential section of the second receiving portion 28a to form a recess extending radially outward.

Figure 8:
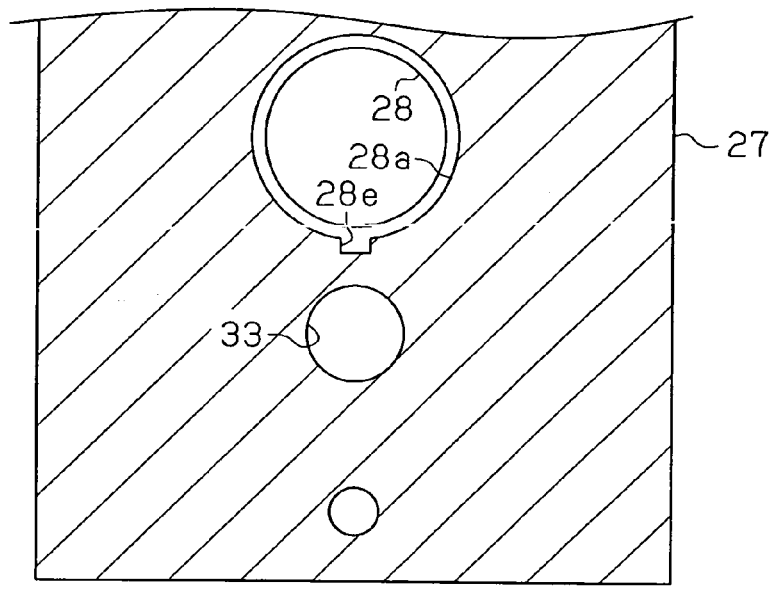
FIG. 8 is a partial cross-sectional view of the pump housing taken along line 8-8 of FIG. 6.

As shown in FIGS. 8A and 8B, the washer 41 is formed by removing a part from an annular body, and substantially has the same outer diameter as the second receiving portion 28a. One of the facing ends of the washer 41 functions as a bearing engagement portion (first engagement portion) 42 that engages with the engagement groove 15b of the second bearing 15. The washer 41 also has a rotation prevention portion (second engagement portion) 43 that engages with the engagement groove 28e of the pump housing 27. In a state where the washer 41 is located in the second receiving portion 28a, the rotation prevention portion 43 engages with the engagement groove 28e, so that the washer 41 is prevented from rotating in the second receiving portion 28a. The washer 41 is formed such that the bearing engagement portion 42 is bent toward the second bearing 15 when the washer 41 is located in the second receiving portion 28a. Thus, when the engagement groove 15b of the second bearing 15 circumferentially matches with the bearing engagement portion 42, the bearing engagement portion 42 enters and engages with the engagement groove 15b. This prevents the outer ring 15a of the second bearing 15 from rotating in the rotating direction of the rotary shaft 12.

When assembling the pump apparatus 1 of this embodiment, the washer is provided between the second receiving portion 28a and the second bearing 15, as in the first embodiment, when the pump unit 3 is assembled with the motor unit 2. Specifically, the pump unit 3 is assembled with the motor unit 2 with the rotation prevention portion 43 of the washer 41 engaged with the engagement groove 28e of the second receiving portion 28a. Then, the bearing engagement portion 42 of the washer 41 engages with the engagement groove 15b of the second bearing 15.

In this embodiment, since the outer ring 15a of the second bearing 15 is prevented from undesirably rotating in the second receiving portion 28a, damages due to wear of the second bearing 15 and the pump housing 27 are reduced.

Since the washer 41 has the same outer diameter as the second bearing 15, the position of the washer 41 is prevented from being displaced in the second receiving portion 28a. Therefore, when the rotary shaft 12 is rotating, the second bearing 15 is reliably prevented from undesirably rotating in the second receiving portion 28a.

In the second embodiment, the outer ring 15a of the second bearing 15 is prevented from rotating in the rotating direction of the rotary shaft 12. That is, when the rotary shaft 12 rotates in a reverse direction opposite to the forward direction, the washer 41 of FIG. 9A permit the outer ring 15a to rotate together with the rotary shaft 12. However, it may be configured that the outer ring 15a is prevented from rotating in both directions. For example, a washer 51 shown in FIG. 10A and FIG. 10B has a first engagement portion 52 that restricts rotation of the outer ring 15a in one direction and a second engagement portion 53 that restrict rotation of the outer ring 15a in the other direction. In this case, even if the rotary shaft 12 rotates in the reverse direction for some reason, the outer ring 15a is restricted from rotating in the second receiving portion 28a.

Figure 9A:
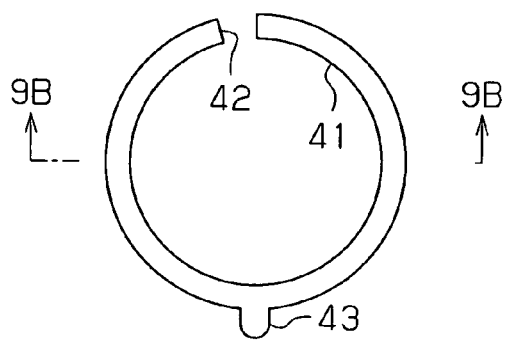
FIG. 9A is a front view illustrating a washer according to a second embodiment.
Figure 9B:
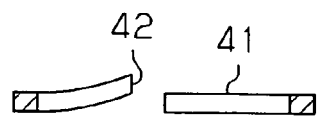
FIG. 9B is a cross-sectional view taken along line 9B-9B of FIG. 9A.

In place of the washer 41 of FIG. 9A, a washer 57 shown in FIGS. 11A and 11B may be used. Opposing ends of the washer 57 form engagement portions 55, 56 that are bent in opposite direction with respect to the axial direction of the washer 57. Like the bearing engagement portion 42 of the washer shown in FIG. 9A, the engagement portion 55 engages with the engagement groove 15b of the second bearing 15. Further, as shown in FIG. 12, an engagement groove 58 is formed in the second receiving portion 28a of the pump housing 27, more specifically, in a surface of the second receiving portion 28a that faces the washer 57 with respect to the axial direction. The engagement groove 58 is engageable with an engagement portion 56. The engagement groove 58 corresponds to the engagement groove 28e of the pump housing 27 shown in FIG. 8, the engagement portion 56 corresponds to rotation prevention portion 43 of the washer 41 shown in FIG. 9A.

As a mechanism for preventing the outer ring 15a of the second bearing 15 from undesirably rotating in the second receiving portion 28a, a mechanism for pushing (holding) the outer circumferential surface of the second bearing 15 may be employed. As such a pushing mechanism (holding mechanism), a structure, for example, shown in FIG. 13A and FIG. 13B is may be employed. As shown in the drawings, the pump housing 27 has extruding grooves 62 extending from the opposite outer surfaces of the pump housing 27 to the vicinity of the second receiving portion 28a. A thin portion 63 is formed between the inner circumferential surface of the second receiving portion 28a and the inner bottom surface of each extruding groove 62. After fixing the pump housing 27 to the yoke housing 4, an extruding member (not shown) is inserted into the extruding groove 62 to push the corresponding thin portion 63 from the outside. The thin portions 63 are pushed in the radially inward directions of the second receiving portions 28a, and pressed against the outer ring 15a of the second bearing 15. As a result, the outer ring 15a is held by and prevented from undesirably rotating by the thin portions 63. The thin portions 63 function as pushing portions (holding portions) that push or hold the outer ring 15a (the outer circumferential surface of the second bearing 15, or pressing portions that are pressed against the outer ring 15a (the outer circumferential surface of the second bearing 15).

According to the configuration shown in FIG. 13A and FIG. 13B, no components such as washers need to be prepared to form an rotation prevention mechanism. Also, since the extruding grooves 62 and the thin portions 63 are simultaneously formed when the pump housing 27 is cast, the extruding grooves 62 and the thin portions 63 are easily formed.

Further, as a mechanism for pushing (holding) the outer circumferential surface of the second bearing 15, a structure shown in FIG. 14A and FIG. 14B may be employed. As shown in the drawings, the pump housing 27 has through holes 67 extending from the opposite outer surfaces of the pump housing 27, respectively, to the second receiving portion 28*a*. After fixing the pump housing 27 to the yoke housing 4, resin is injected through the through holes 67 to the space between the inner circumferential surface of the second receiving portion 28*a* and the outer circumferential surface of the second bearing 15. The resin is left to cure. The resin functions as a pushing portion (holding portion) that pushes or holds the outer ring 15*a* (the outer circumferential surface of the second bearing 15, or a pressing portion that is pressed against the outer ring 15*a* (the outer circumferential surface of the second bearing 15). The resin spreads to the entire circumferential space between the inner circumferential surface of the second receiving portion 28*a* and the outer circumferential surface of the second bearing 15, thereby holding the entire outer circumferential surface of the second bearing 15. Therefore, the second bearing 15 is reliably prevented from undesirably rotating.

As an rotation prevention mechanism, structure of FIG. 15 may be employed in which a C ring or O ring R functioning as a pressing member is attached to the outer circumferential surface of the second bearing 15 (the outer ring 15*a*). The C ring or O ring R is fitted in an accommodation groove 71 formed in the outer circumferential surface of the outer ring 15*a*. The C ring or O ring R is pressed against the inner circumferential surface of the second receiving portion 28*a*, and prevents the outer ring 15*a* from undesirably rotating in the second receiving portion 28*a*. The C ring or O ring R functions as a pressing portion that is pressed against the outer ring 15*a* (the outer circumferential surface of the second bearing 15). The prevention mechanism is formed by a simple construction in which the C ring or O ring R is fitted in the accommodation groove 71 of the second bearing 15.

Figure 16:
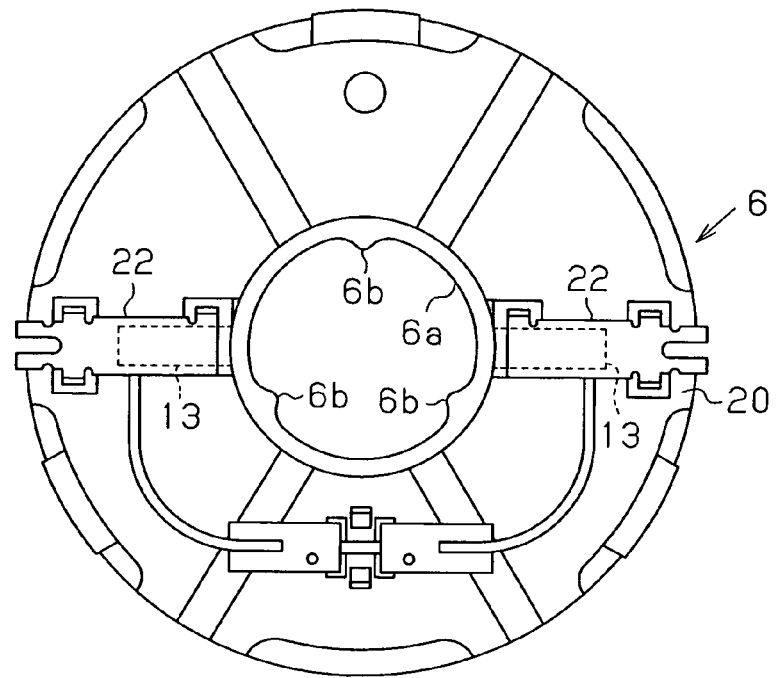
FIG. 16 is a front view illustrating a base plate according to a modification.

As shown in FIG. 16, support projections 6*b* that protrude radially inward may be formed on the inner circumferential surface of the through hole 6*a* the base plate 20. FIG. 16 shows the base plate 20 of the pump apparatus 1 shown in FIG. 1 as viewed from the right of FIG. 1. The support projections 6*b* are preferably tapered. The support projections 6*b* support the outer circumferential surface of the second bearing 15 inserted into the through hole 6*a* (see FIG. 1). By forming the support projections 6*b* to have a height corresponding to the outer circumferential surface of the second bearing 15, the second bearing 15 is supported in the through hole 6*a*. Compared to a structure that supports the outer circumferential surface of the second bearing 15 with the entire inner circumferential surface of the through hole 6*a*, the support projections 6*b* more reliably support the second bearing 15 while reducing radial chattering of the second bearing 15. As a result, radial vibrations of the rotor 5 are suppressed. It may be configured that, when the second bearing 15 is inserted into the through hole 6*a*, the distal ends of the support projections 6*b* are slightly collapsed by the outer circumferential surface of the second bearing 15. In this case, no clearance is created between each support projection 6*b* and the second bearing 15. The second bearing 15, that is, the rotor 5, is more stably supported.

Figure 17:
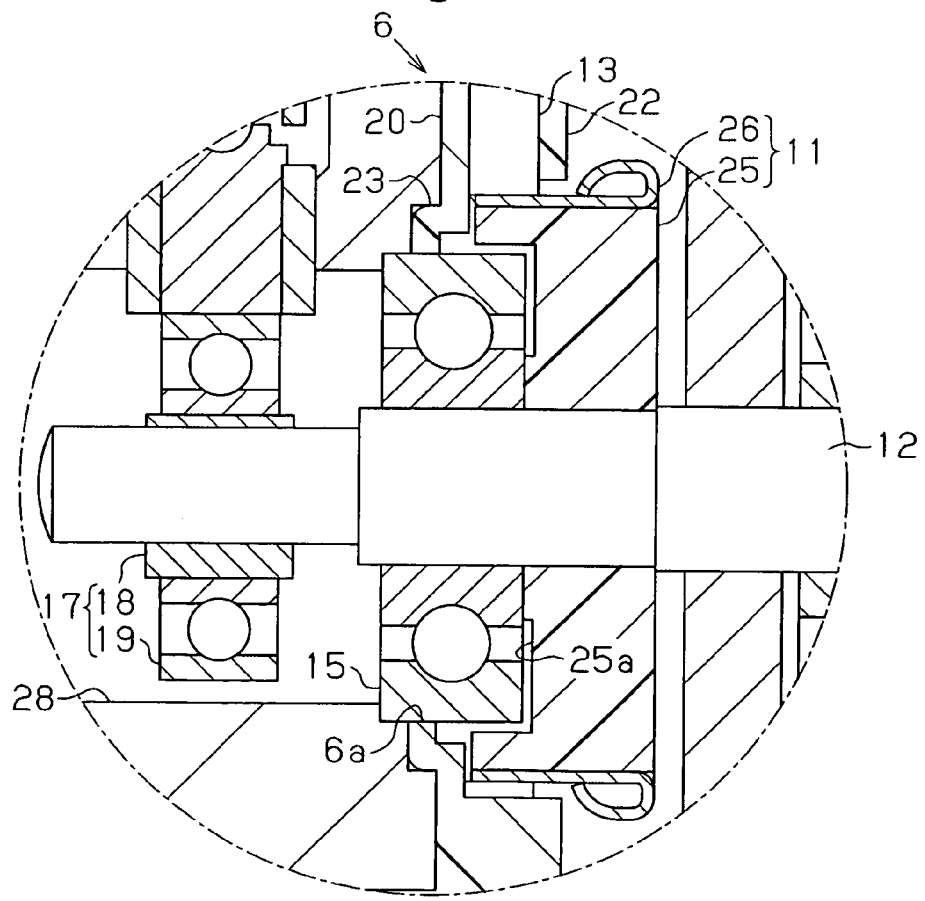
FIG. 17 is an enlarged partial cross-sectional view illustrating an pump apparatus according to a modification.

In FIG. 1, the second bearing 15 and the commutator 11 are adjacent to each other with respect to the axial direction. However, the second bearing 15 and the commutator 11 may overlap each other with respect to the axial direction. For example, in a modification shown in FIG. 17, the insulator 25 of the commutator 11 has an accommodation recess 25*a* for accommodating the second bearing 15 in a surface that faces the second bearing 15. The second bearing 15 is accommodated in the accommodation recess 25*a*, so that the second bearing 15 and the commutator 11 overlap each other in the axial direction. This further reduces the size of the motor unit 2 in the axial direction.

Figure 18:
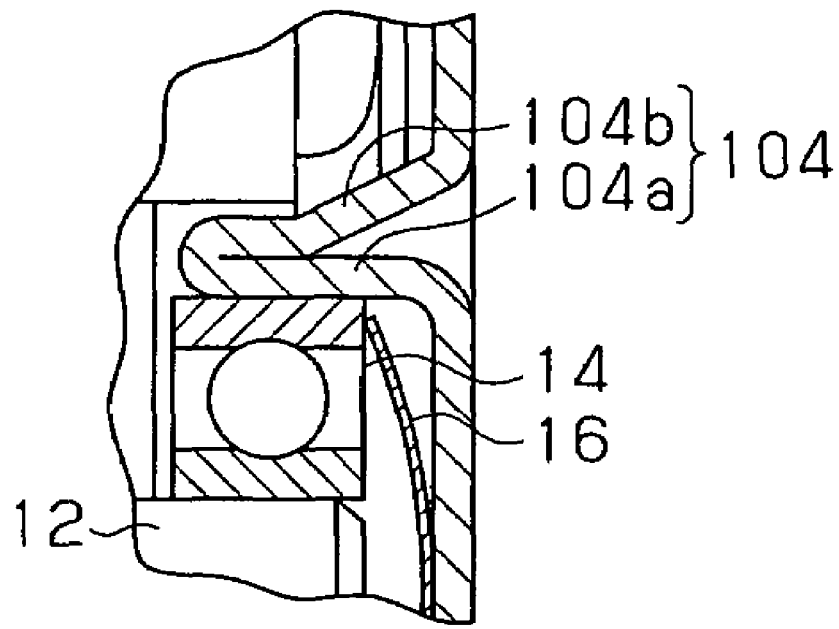
FIG. 18 is a partial cross-sectional view illustrating a support portion according to a modification.
Figure 19:
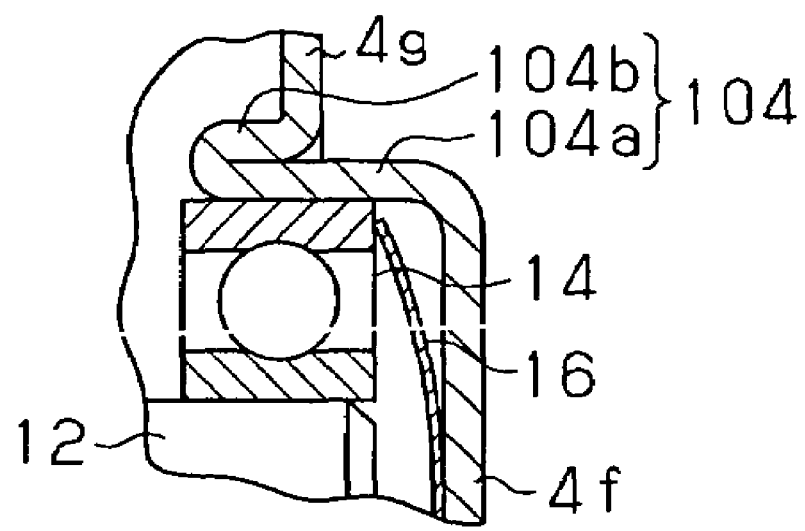
FIG. 19 is a partial cross-sectional view illustrating a support portion according to another modification.

FIGS. 18 and 19 show modifications of the support portion 104, which supports the first bearing 14. In the example of FIG. 18, the first and second walls 104*a*, 104*b* of the support portion 104 closely contact each other from the distal end to the middle portion with respect to the axial direction. The second wall 104*b* gradually widens radially outward from the middle portion toward the proximal end of the support portion 104 with respect to the axial direction, and gradually separates from the first wall 104*a* by an increasing amount. This structure increases the strength of the support portion 104 in the radial direction, thereby further stably support the first bearing 14.

In the example of FIG. 19, the inner wall portion 4*f* forming the bottom wall of the support portion 104 protrudes outward in the axial direction relative to the outer wall portion 4*g* about the inner wall portion 4*f*. The outer wall portion 4*g* corresponds to a middle portion of the first bearing 14 in the axial direction, and radially supports the first bearing 14 with the support portion 104. This structure permits a radial load that is applied from the first bearing 14 to the support portion 104 to be reliably received by the outer wall portion 4*g*, thereby improving the strength of the yoke housing 4 against radial loads.

The illustrated embodiments may be modified further as follows.

In the illustrated embodiments, when the motor unit 2 attached to the pump unit 3, the second bearing 15 contacts the bearing receiving surface 28*c* of the pump housing 27, so that the position of the motor unit 2 is determined with respect to the pump unit 3. However, as shown in FIG. 2, the holding portion 23 of the base plate 20, for example, may contact a receiving surface (stopping surface) 28*d* formed on the first receiving portion 28*b* of the pump housing 27, so that the receiving surface 28*d* determines the position of the motor unit 2 relative to the pump unit 3.

The disc spring 16 located in the support portion 104 for urging the rotor 5 may be replaced by other urging members such as a coil spring or a wave washer.

The base plate 20 does not necessarily formed of resin, but may be made of, for example, metal.

The base plate 20 does not necessarily pressed into the opening 4*a* of the yoke housing 4. For example, the base plate 20 may be fixed to the yoke housing 4 with screws.

In the illustrated embodiments, the base plate 20 is molded as an integral resin component that has the integrated holder main body 22 and holding portion 23. However, the holder main body 22 may be made of metal and assembled with the resin base plate 20.

In FIG. 1, both of the first bearing 14 and the commutator 11 overlap the coils 9 along the axial direction. However, only one of the first bearing 14 and the commutator 11 may overlap the coils 9 with respect to the axial direction.

In FIG. 1, the inner wall portion 4*f* forming the bottom wall of the support portion 104 may be recessed in the axial direction relative to the outer wall portion 4*g* about the inner wall portion 4*f*.

In FIG. 2, the outer diameter CD2 of the insulator 25 of the commutator 11 is greater than the outer diameter BD of the second bearing 15. However, as long as the outer diameter CD1 of the entire commutator 11 including the segments 26 is greater than the outer diameter BD of the second bearing 15, the outer diameter CD2 of the insulator 25 may be smaller than or equal to the outer diameter BD of the second bearing 15. In this case, to prevent the segments 26 from contacting the second bearing 15, the insulator 25 is preferably formed, for example, to project toward the second bearing 15 relative to the segments 26.

The support portion 104 supporting the first bearing 14 is not limited to the double-layer structure, but may be triple or more layer structure.

A recessed accommodation portion may be formed in a portion of the core 8 that faces the commutator 11 to accommodate a part of the commutator 11.

A driven device coupled the motor unit 2 is not limited to the pump unit 3. That is, the motor according to the present invention may be applied to various types of apparatus other than the pump apparatus 1.

The invention claimed is:

1. A motor attached to a driven device to drive the driven device, the driven device including a housing member, the motor comprising:
    a cylindrical yoke housing that has a bottom wall at one end and an opening at the other end, the driven device being attached to the side of the yoke housing where the opening is formed;
    a rotor accommodated in the yoke housing, wherein the rotor includes a rotary shaft, an armature, and a commutator, the armature having a core and a coil wound about the core, wherein the armature and the commutator are fixed to the rotary shaft;
    a bearing that supports the rotary shaft, wherein the armature, the commutator, and the bearing are arranged on the rotary shaft in this order in a first direction from the bottom wall toward the opening;
    a base plate attached to the opening of the yoke housing, wherein the base plate has a through hole into which the bearing is inserted such that the bearing is movable in the axial direction relative to the through hole, and the commutator has an outer diameter greater than an inner diameter of the through hole; and
    an urging member that urges the rotor in the first direction, wherein, in a state where the driven device is not attached to the yoke housing, the urging member urges the rotor so as to press the commutator against a portion of the base plate about the through hole while a part of the bearing is exposed from the base plate, the exposed part of the bearing including an end face and a part of an outer circumferential surface, and
    wherein, when the driven device is attached to the yoke housing, the housing member pushes the end face of the bearing while holding the part of the outer circumferential surface, so as to move the rotor in a second direction opposite to the first direction against the urging force of the urging member so that the commutator separates from the base plate.

2. The motor according to claim 1, wherein the housing member includes an accommodation portion accommodating the part of the bearing and a part of the rotary shaft that are exposed from the base plate, and wherein an inner wall of the accommodation portion defines a bearing receiving portion that receives the end face of the bearing.

3. The motor according to claim 2, wherein the bearing is a ball bearing having an outer ring, and wherein the motor includes a prevention mechanism that prevents rotation of the outer ring relative to the housing member.

4. The motor according to claim 3, wherein the prevention mechanism includes an engagement member located between the outer ring and the bearing receiving portion, and wherein the engagement member includes a first engagement portion and a second engagement portion, and wherein the first and second engagement portions are engaged with the outer ring and the bearing receiving portion, respectively, so that rotation of the outer ring relative to the bearing receiving portion is prevented.

5. The motor according to claim 4, wherein the outer ring has an engagement groove that is engaged with the first engagement portion, and wherein the bearing receiving portion has an engagement groove that is engaged with the second engagement portion.

6. The motor according to claim 3, wherein the prevention mechanism includes a pressing portion that is pressed against an outer circumferential surface of the outer ring.

7. The motor according to claim 1, wherein a holder main body is integrally provided on a side of the base plate that is exposed to an interior of the yoke housing, and wherein the holder main body holds a brush that contacts the commutator such that the brush is movable in a radial direction of the commutator.

8. The motor according to claim 1, further comprising first and second bearings supporting the rotary shaft, wherein said bearing is the second bearing, wherein the first bearing is supported by the yoke housing, and wherein at least one of the first bearing and the commutator is arranged to overlap the coil in the axial direction.

9. The motor according to claim 8, wherein the core has a recess-like accommodation portion for accommodating the first bearing in a portion that faces the first bearing.

10. The motor according to claim 8, wherein the second bearing is arranged to overlap the commutator in the axial direction.

11. The motor according to claim 10, wherein the commutator has an accommodation recess for accommodating the second bearing in a portion that faces the second bearing.

12. The motor according to claim 8, wherein a support portion for accommodating and holding the first bearing is formed in a center of the bottom wall of the yoke housing, wherein the bottom wall includes a radially inner wall portion corresponding to the support portion, and a radially outer wall portion provided about the innerwall portion, and wherein the inner wall portion is formed so as not to protrude further outward in the axial direction than the outer wall portion.

13. The motor according to claim 1, further comprising first and second bearings supporting the rotary shaft, wherein said bearing is the second bearing, wherein an annular support portion for accommodating and holding the first bearing is formed on the bottom wall of the yoke housing, wherein the support portion projects from the bottom wall toward the opening of the yoke housing, and wherein the support portion includes a plurality of annular walls, at least parts of an adjacent pair of the annular walls closely contacting each other with respect to the radial direction.

14. The motor according to claim 13, wherein the annular walls include a first wall and a second wall, and wherein at least a portion of each of the first and second walls in the axial direction closely contacts the other wall.

15. The motor according to claim 14, each of the first and second walls has a proximal end connected to the bottom wall, and a distal end separated from the bottom wall, wherein the second wall closely contacts the first wall from the distal end to a middle portion in the axial direction, and wherein, from the middle portion to the distal portion in the axial direction, the second wall gradually separates from the first wall by an increasing amount.

16. The motor according to claim 13, wherein the bottom wall of the yoke housing includes a radially inner wall portion corresponding to the support portion, and a radially outer wall portion provided about the inner wall portion, and wherein the inner wall portion and the outer wall portion are located in a common plane.

17. The motor according to claim 13, wherein the core has a recess-like accommodation portion for accommodating the first bearing or the commutator on at least one of end faces facing opposite directions from each other in the axial direction.

18. The motor according to claim 1, further comprising first and second bearings supporting the rotary shaft, wherein said bearing is the second bearing, and the first bearing is supported by the yoke housing, and wherein the core has a recess-like accommodation portion for accommodating the first bearing or the commutator on at least one of end faces facing opposite directions from each other in the axial direction.

19. The motor according to claim 1, wherein the base plate is made of resin.

20. The motor according to claim 19, wherein a plurality of support projections project radially inward from an inner circumferential surface of the through hole.

21. The motor according to claim 20, wherein each support projection is tapered.

* * * * *